Oct. 13, 1970   P. E. GAUDRY ET AL   3,533,666
BALL BEARING RETAINER FOR A CORDWINDER
Original Filed June 20, 1967

INVENTORS
PAUL E. GAUDRY
EDOUARD GAUDRY
RAYMOND DESCARRIES
JAMES ANDERSON

William S. Henry
THEIR ATTORNEY

United States Patent Office 3,533,666
Patented Oct. 13, 1970

3,533,666
BALL BEARING RETAINER FOR A
CORDWINDER
Paul E. Gaudry, Laval des Rapides, Edouard Gaudry, Cite St. Laurent, Raymond Descarries, Montreal, and James Anderson, Baie d'Urfe, Quebec, Canada, assignors, by mesne assignments, to Consolidated Foods Corporation, Chicago, Ill., a corporation of Maryland
Original application June 20, 1967, Ser. No. 647,378. Divided and this application Dec. 19, 1968, Ser. No. 798,548
Int. Cl. F16c 33/38
U.S. Cl. 308—201
4 Claims

ABSTRACT OF THE DISCLOSURE

A ball bearing retainer of relatively flexible plastic material and having a frusto-conical configuration. The balls of the bearing are retained in rectangular apertures in which each of the longitudinal surfaces of the retainer defining the apertures have a recess defining a pair of lips that grip the balls and hold them in the retainer. The balls are free to move in the apertures relative to the retainer.

---

This application is a division of Ser. No. 647,378, filed June 20, 1967.

BACKGROUND OF THE INVENTION

The invention relates to a multibrush combined floor polisher-rug scrubber machine of the type generally known from such U.S. Pats. as 3,153,251, 3,186,022 and 3,275,760.

In the known apparatus to which this invention pertains manufacturing assembly and more particularly field repairs have been time consuming and expensive because skilled mechanics are required for ths purpose and repairs could not be made at the residence of the machine's owner.

The disadvantage mentioned above are substantially eliminated according to this invention and additional advantages and features are provided as will be apparent from the detailed description to follow.

SUMMARY OF THE INVENTION

This invention relates to an improved, combination floor polisher-rug scrubber having an integrated, unitized construction to facilitate manufacturing assembly and repair by relatively unskilled persons who can replace defective and worn parts in situ in a quick and simplified manner. To this end the cordwinder assembly comprises a tray within which the cord reel or spool is housed on a replaceable ball bearing having a simplified and improved ball retainer.

An object of the invention is to provide an improved cordwinder for floor polishers and other mobile electric machines having electric cords.

Another object of the invention is to provide an inexpensive, replaceable ball retainer for a ball bearing.

Figure 3:
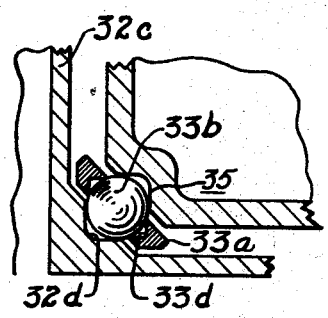
FIG. 3 is a detailed cross-sectional view of the ball bearing support for the cord reel within the cordwinder tray as seen in FIG. 2.
Figure 1:
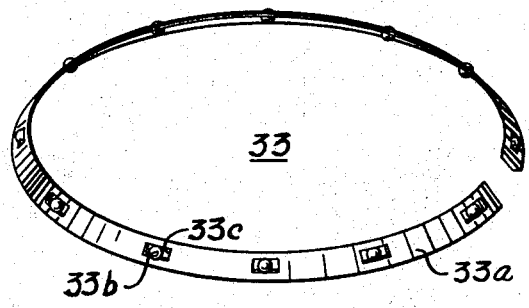
FIG. 1 is a perspective view of a ball bearing cage or retainer according to the invention.

The ball bearing 33 comprises a ball retainer 33a and a series of spaced balls 33b held in the apertures 33c formed in the retainer. As shown in FIG. 3 the upper and lower walls of the retainer 33a defining apertures 33c are recessed at 33d so that the balls are held in the associated aperture but are free to rotate and move circumferentially. As seen in FIG. 1 the ball bearing retainer 33a is discontinuous for quick and easy assembly over the tray platform 34 and into position on the inner ball race 32d.

Figure 2:
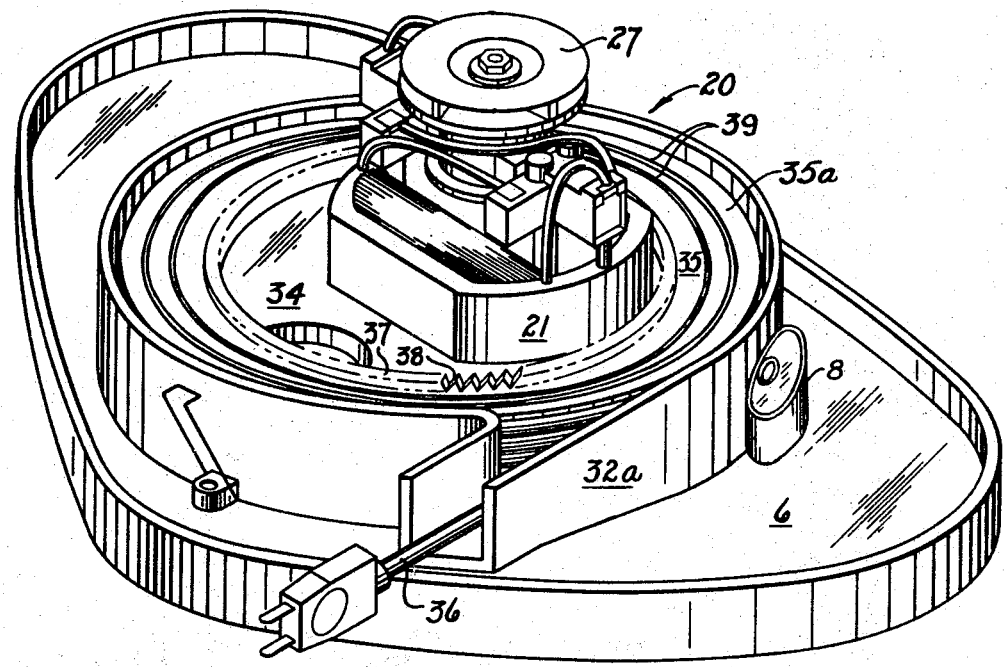
FIG. 2 is a perspective view cordwinder having a ball bearing with a retainer according to this invention.

FIG. 2 is a perspective view of a cordwinder reel 35 in the well of tray 32. The reel 35 has a pair of spaced radial flanges (only one is shown in FIG. 2) between which a length of electric cord 36 is wound. The reel 35 fits loosely in the well of tray 32 and is supported on the ball bearing 33. As best seen in FIG. 3 the reel 35 is provided with an inwardly directed outer ball race 36. The tray 32 and the reel 35 are spaced from one another by bearing 33 and the weight of the reel 35 is born entirely by the ball bearing 33.

What is claimed is:

1. A retainer for a ball bearing comprising a frusto-conical member of flexible material having a plurality of angularly spaced apertures of rectangular configuration, each said aperture having its longitudinal axis extending parallel with the peripheral plane of said frusto-conical member, each said aperture being defined by a first pair of opposed longitudinally extending surfaces, each of said first surfaces having a recess extending axially of said member for defining a pair of lips at said first surfaces and coextensive therewith, the distance between said pairs of lips and the depth of said recesses being selected to hold a ball of known dimension in said apertures between the pairs of opposed lips; a pair of opposed second surfaces defining said apertures, said second surfaces being spaced apart a distance greater than the diameter of a ball adapted to be held in said aperture; and a ball in each said aperture which is free to move in the direction of said longitudinal axis relative to said frusto-conical member.

2. A retainer according to claim 1 wherein said recess is U-shaped.

3. A retainer according to claim 2 wherein said member is discontinuous.

4. A retainer according to claim 3 wherein said member consists of a synthetic resin material.

References Cited

UNITED STATES PATENTS

| | | | |
|---|---|---|---|
| 442,289 | 12/1890 | Lake | 308—201 |
| 1,068,116 | 7/1913 | Eitner | 308—201 |
| 1,222,760 | 4/1917 | Hein | 308—201 |
| 2,382,975 | 8/1945 | Coddington | 308—235 |
| 3,399,008 | 8/1968 | Farrell et al. | 308—201 |

MARTIN P. SCHWADRON, Primary Examiner

F. SUSKO, Assistant Examiner

U.S. Cl. X.R.

308—235